(12) United States Patent
Butz et al.

(10) Patent No.: US 9,597,948 B2
(45) Date of Patent: Mar. 21, 2017

(54) VEHICLE HATCH ASSEMBLY

(71) Applicant: Spheros North America, Inc., Canton, MI (US)

(72) Inventors: Timo Butz, Turku (FI); Marko Tapio Jokila, Naantali (FI)

(73) Assignee: SPHEROS NORTH AMERICA, INC., Elkhart, IN (US)

( * ) Notice: Subject to any disclaimer, the term of this patent is extended or adjusted under 35 U.S.C. 154(b) by 0 days.

(21) Appl. No.: 14/734,203

(22) Filed: Jun. 9, 2015

(65) Prior Publication Data

US 2016/0361983 A1 Dec. 15, 2016

(51) Int. Cl.
| | | |
|---|---|---|
| *B60J 7/08* | (2006.01) | |
| *B60J 7/19* | (2006.01) | |
| *B60J 7/16* | (2006.01) | |
| *E05C 3/04* | (2006.01) | |
| *E05C 3/12* | (2006.01) | |

(52) U.S. Cl.
CPC .............. *B60J 7/19* (2013.01); *B60J 7/1642* (2013.01); *E05C 3/046* (2013.01); *E05C 3/124* (2013.01)

(58) Field of Classification Search
CPC . B60J 7/19; B60J 7/1642; E05C 3/124; E05C 3/046
USPC ........................................................ 296/146.1
See application file for complete search history.

(56) References Cited

U.S. PATENT DOCUMENTS

| | | |
|---|---|---|
| 4,412,404 A | 11/1983 | Manning |
| 4,433,506 A | 2/1984 | Manning |
| 4,495,731 A | 1/1985 | Sears |
| 4,592,269 A | 6/1986 | Lamparter |
| 4,895,065 A | 1/1990 | Lamparter |
| 4,964,673 A | 10/1990 | Lamparter |
| 6,540,288 B1 | 4/2003 | Tobin |
| 6,572,182 B2 | 6/2003 | Lamparter et al. |
| 6,609,750 B1 * | 8/2003 | Cauduro ................ B60J 7/1642 296/216.02 |
| 7,140,959 B2 | 11/2006 | Haigh et al. |
| 7,166,023 B2 | 1/2007 | Haigh et al. |
| 2005/0095973 A1 | 5/2005 | Haigh et al. |

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A hatch assembly attachable to a roof of a vehicle includes a removable dome attached to a frame including opposed first and second linkage mechanisms and a latch assembly. The frame includes an annular sidewall section defining an aperture and an outwardly extending flange portion peripheral to the annular wall portion and includes a continuous upper peripheral surface. The dome has an outer planar surface covering the aperture and an inner surface including a hinge portion attached to the first linkage assembly. A latch assembly attaches to the inner surface of the dome on a side of the dome that is opposed to the hinge portion. The latch assembly rotatably couples to a lock wedge, which includes a helical locking surface.

16 Claims, 4 Drawing Sheets

VEHICLE HATCH ASSEMBLY

TECHNICAL FIELD

This disclosure relates to hatches for vehicles.

BACKGROUND

Vehicles may be equipped with one or more hatches that may be located on a roof to provide ventilation and/or enable passenger escape in an emergency situation.

Known hatches may protrude from the vehicle roof by several inches, and may require multiple operators to position and secure the hatch onto the vehicle roof during assembly.

SUMMARY

A hatch assembly attachable to a roof of a vehicle is described, and includes a removable dome attached to a frame including opposed first and second linkage mechanisms and a latch assembly. The frame is mountable in an opening through the roof of the vehicle and includes an annular sidewall section defining an aperture and an outwardly extending flange portion peripheral to the annular wall portion. The annular sidewall section includes a continuous upper peripheral surface. The dome has an outer planar surface covering the aperture and an inner surface including a hinge portion, wherein the hinge portion rotatably attaches to the first linkage assembly. A latch keeper attaches to the second linkage assembly. A latch assembly attaches to the inner surface of the dome on a side of the dome that is opposed to the hinge portion. The latch assembly rotatably couples to a lock wedge, which includes a helical locking surface. The lock wedge disengages from the latch keeper when the latch assembly is at a first position associated with a first limit of rotational travel, and engages the latch keeper to urge the latch keeper to a second position when the latch assembly rotates to a second, opposed limit of rotational travel. The dome seats onto the frame when the first and second linkage mechanisms are in closed positions and the latch assembly is at the second position.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
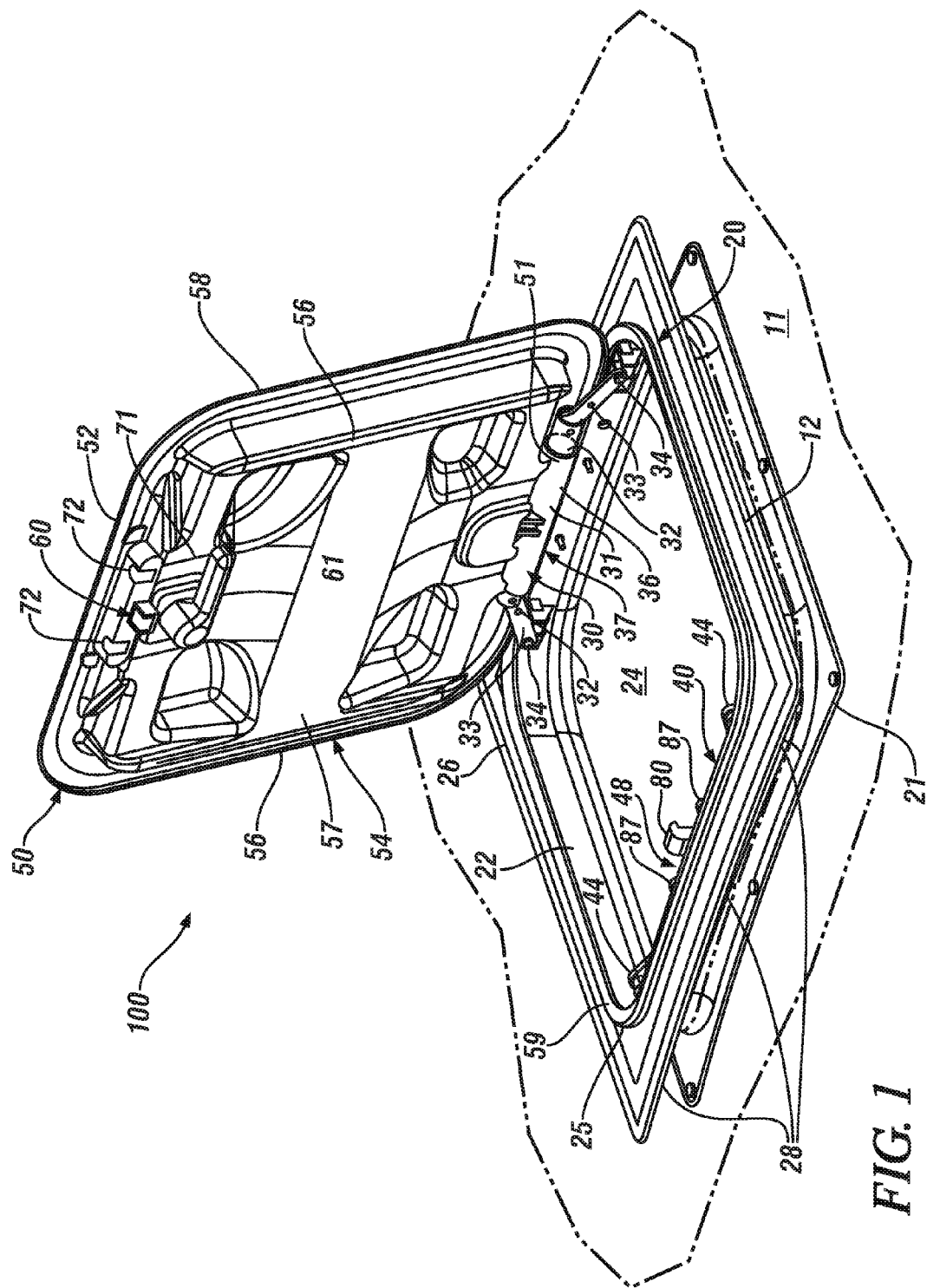
FIG. 1 schematically illustrates an isometric top view of an exterior-mounted outwardly-opening low-profile hatch assembly positioned in an opened state, in accordance with the disclosure.
Figure 2:
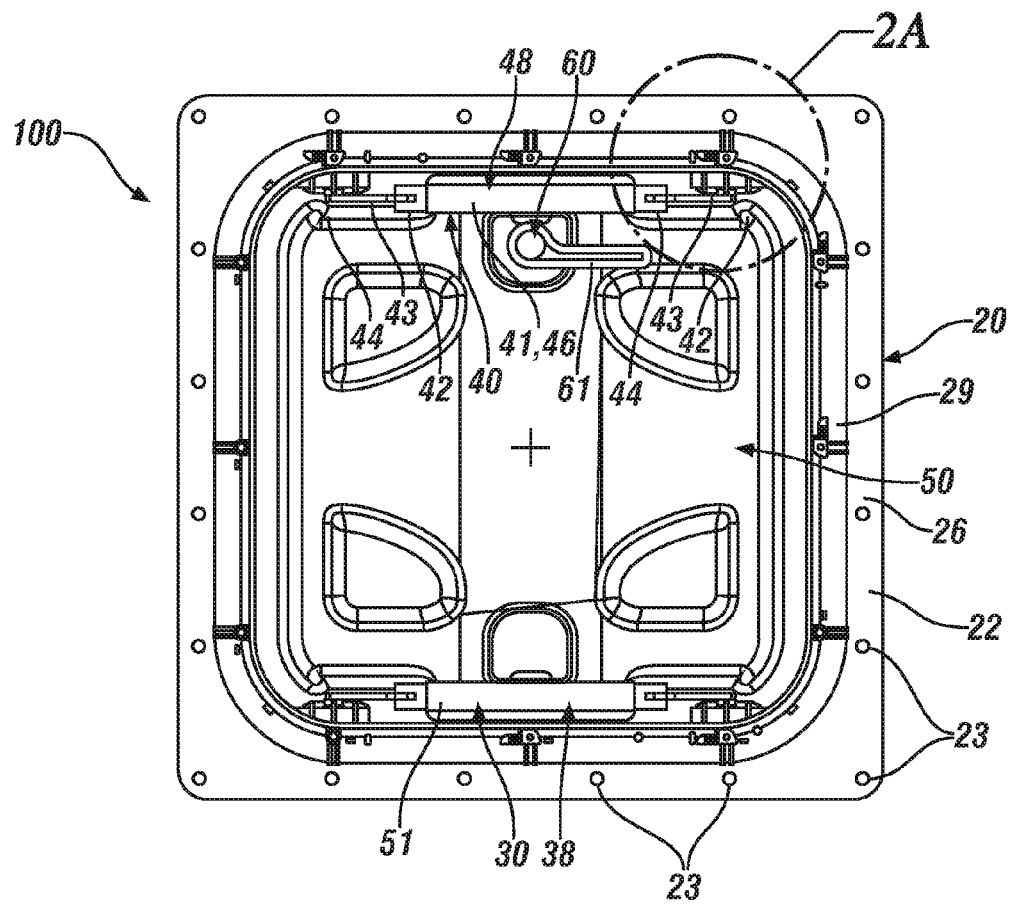
FIGS. 2 and 2A schematically illustrate a bottom plan view of the hatch assembly in a closed state, in accordance with the disclosure.
Figure 2A:
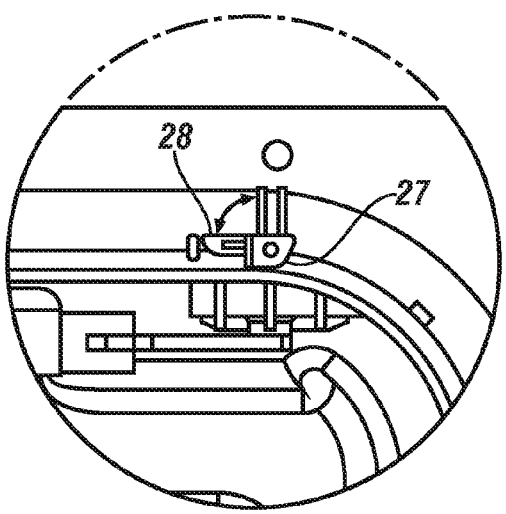
Figure 3:
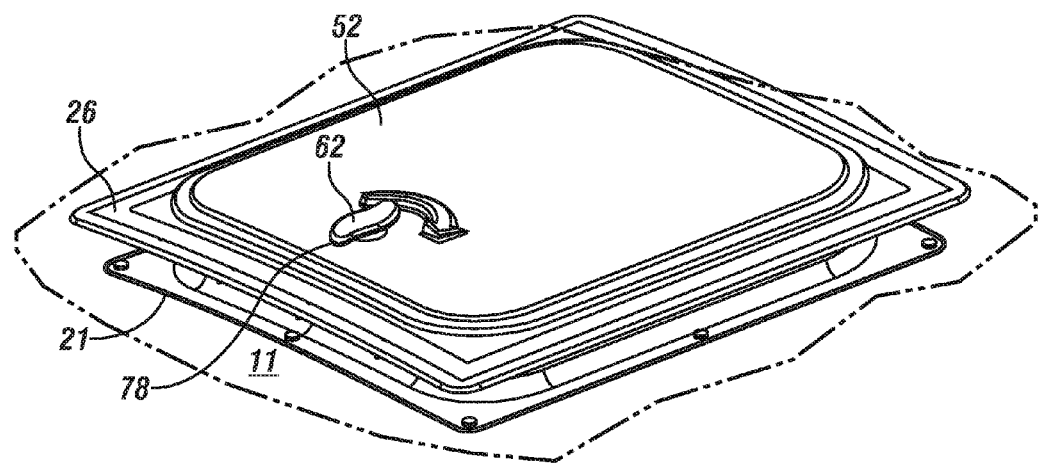
FIG. 3 schematically illustrates an isometric top view depicting the hatch assembly in the closed state, in accordance with the disclosure.

Referring now to the drawings, wherein the depictions are for the purpose of illustrating certain exemplary embodiments only and not for the purpose of limiting the same, FIGS. 1, 2 and 3 illustrate various views of an embodiment of an exterior-mounted outwardly-opening low-profile hatch assembly 100 that may be deployed through a pass-through opening 12 of a roof section 11 of a vehicle, a portion of which is shown. Like numerals refer to like elements throughout the various views shown herein. FIG. 1 illustrates an isometric top view depicting the hatch assembly 100 in an opened state, FIGS. 2 and 2A illustrate a bottom plan view of the hatch assembly 100 in a closed state, and FIG. 3 illustrates an isometric top view depicting the hatch assembly 100 in the closed state. The pass-through opening 12 as shown is rectangularly-shaped having non-limiting dimensions that are nominally 24 inches by 24 inches in one embodiment.

The hatch assembly 100 includes a frame 20, a dome 50, and a latch assembly 60. As used herein, the term 'vertical' indicates a direction that projects orthogonal to a planar surface of the roof section 11 of the vehicle, and the term 'planar' coincides with the planar surface of the roof section 11. As used herein, the terms 'inward' and 'inner' refer to elements of the hatch assembly 100 that are towards an interior portion of the vehicle and the terms 'outward', 'outer' and 'upper' refer to elements of the hatch assembly 100 that are towards a vehicle exterior.

The planar surface of the roof section 11 may be flat, or may have some amount of curvature, and is preferably flexible over range from completely flat to a roof section 11 having a planar radius of 2350 mm (92.5 inches). The hatch assembly 100 is preferably fabricated from material having sufficient flexibility to conform to the planar surface of the roof section 11.

The frame 20 is a rigid device that is molded from thermoplastic material and includes an annular sidewall section 22 that defines a substantially rectangular aperture 24, and an outwardly extending flange portion 26. As employed herein, the term "substantially rectangular" is defined as meaning that the overall shape is rectangular but with rounded corners, i.e., each of the inside corners of the aperture 24 formed by the frame 20 has a radial element. The sidewall section 22 is a continuous vertical wall located on an inner periphery of the aperture 24 that preferably projects through the pass-through opening 12 of the roof section 11 when the hatch assembly 100 is assembled onto a vehicle. The sidewall section 22 and the outwardly extending flange portion 26 are preferably designed such that a substantial portion of the sidewall section 22 protrudes into the vehicle interior to minimize the vertical height of the frame 20 and thus minimize the overall height of the hatch assembly 100 outside of the vehicle above the line of the roof section 11. The sidewall section 22 and the outwardly extending flange portion 26 are preferably fabricated as a single piece using injection molding or another suitable process.

The sidewall section 22 has a continuous upper peripheral surface 25 on which a resilient dome gasket 59 is assembled by gluing or another suitable bonding operation. Alternatively, the resilient dome gasket 59 may be bonded to an inner portion 54 of the dome 50. A resilient frame gasket 29 is assembled onto a portion of the sidewall section 22 at a junction between the flange portion 26 and the sidewall section 22 on an inward side of the frame 20 such that the frame gasket 29 forms an environmental seal between the frame 20 and the roof section 11 of the vehicle around a periphery of the opening 12 when the frame 20 is assembled onto an exterior portion of the vehicle. An inner side of the flange portion 26 includes a plurality of molded threaded mounting bosses 27 around the periphery proximal to the sidewall section 22. Each of the mounting bosses 27 includes a cam tie-down latch 28 and associated an fastener.

The cam tie-down latches 28 are in a closed position prior to assembly of the frame 20 into the pass-through opening 12 of the roof section 11. After the frame 20 is assembled into the pass-through opening 12 of the roof section 11, the fasteners holding the cam tie-down latches 28 can be loosened, allowing the cam tie-down latches 28 to be rotated 90° by an installer to overlap with the roof section 11. The fasteners can be tightened to compress the frame gasket 29, forming an environmental seal between the externally mounted frame 20 and the roof section 11 of the vehicle. Alternatively, a second set of fasteners can be inserted through second attachment bosses 23 located on an outer periphery of the frame 20 and pass through threaded openings in the roof section 11 to compress the frame gasket 29 and form an environmental seal between the externally mounted frame 20 and the roof section 11 of the vehicle. An annular trim ring 21 may be assembled from the inside of the vehicle onto the frame 20 to cover the opening 12 in the roof section 11 and the cam tie-down latches 28, thus providing aesthetic benefits and additional sealing.

First and second linkage mechanisms 30, 40, respectively, pivotably attach to opposed walls of the sidewall section 22 of the frame 20 at pins 34 and couple to elements of the dome 50 to secure the dome 50 to the frame 20. In one embodiment, and as described herein, the first and second linkage mechanisms 30, 40 may be over-center toggle linkage mechanisms. Other linkage mechanisms, e.g., power-actuated devices such as pneumatically-controlled or electrically-controlled devices may be employed to urge the dome 50 to sealably compress against a portion of the frame 20 to environmentally seal the vehicle interior away from the outside of the vehicle. The first over-center toggle linkage mechanism 30 includes a tubular sleeve member 31 housing a compressible spring 36 that is acted upon by opposed plungers 32. Each of the opposed plungers 32 pivotably connects to a first end of a swinging link 33, and a second end of each of the swinging links 33 pivotably connects to the frame 20 at pins 34. The second over-center toggle linkage mechanism 40 includes a tubular sleeve member 41 housing a compressible spring 46 that is acted upon by opposed plungers 42. Each of the opposed plungers 42 pivotably connects to a first end of a swinging link 43, and a second end of each of the swinging links 43 pivotably connects to the frame 20 at pins 44. The force of the compressible springs 36, 46 urges the respective opposed plungers 32, 42 outwardly, and causes the respective swinging links 33, 43 to rotate in a first outward direction or a second inward direction depending upon whether the corresponding pivotal connection to the corresponding plunger 32, 42 is above or below a longitudinal axis of the corresponding tubular sleeve member 31, 41.

When the respective swinging link 33, 43 rotates in the first outward direction, the respective tubular sleeve member 31, 41 is urged upwardly to a first, open position 37, thus creating a respective opening between the dome 50 and the frame 20. The first tubular sleeve member 31 is shown in the first, open position 37 in FIG. 1. Either or both of the first and second over-center toggle linkage mechanisms 30, 40 may be oriented in the respective first, open position. When the respective swinging link 33, 43 rotates in the second inward direction, the respective tubular sleeve member 31, 41 is urged downwardly to a second, closed position 38, 48, respectively, thus urging the respective side of the dome 50 against the frame 20. The second, closed positions 38, 48 are best shown with reference to FIG. 2. Either or both the first and second over-center toggle linkage mechanisms 30, 40 may be oriented in the respective second closed positions 38, 48. When both the first and second over-center toggle linkage mechanisms 30, 40 are oriented in the second closed positions 38, 48, the first and second compressible springs 36, 46 of the first and second over-center toggle linkage mechanisms 30, 40 urge the dome 50 to sealably compress against the dome gasket 59 on the continuous upper peripheral surface 25 of the sidewall section 22 of the frame 20 to environmentally seal the vehicle interior away from the outside of the vehicle at this location.

An inner portion of the dome 50 includes an attached tubular sleeve 51 that is formed near one of the edges and is parallel with one of the edges of the dome 50. The sleeve 31 of the first over-center toggle linkage mechanism 30 is inserted into the tubular sleeve 51 such that the dome 50 and the tubular sleeve 51 may rotate under certain circumstances, thus opening the dome 50 to permit ingress and egress through the aperture 24. The sleeve 41 of the second over-center toggle linkage mechanism 40 includes orienting tabs 87 that are adjacent to a cam-following latch keeper 80 that preferably project upwardly. The latch keeper 80 interacts with the latch assembly 60 to secure the dome 50 to the frame 20.

The dome 50 is a four-sided device that includes an outer planar portion 52 and the inner portion 54 having features as described herein. The outer planar portion 52 is preferably substantially flush with the flange portion 26 of the frame 20 when the dome 50 is in a completely closed position by having both the first and second over-center toggle linkage mechanisms 30, 40 oriented in the second closed positions 38, 48 urging the dome 50 to sealably compress against the dome gasket 59. As employed herein, the outer planar portion 52 is substantially flush with the flange portion 26 of the frame 20 in that an outer surface of the outer planar portion 52 is even or level with the outer surface of the flange portion 26 of the frame 20. As such, the outwardly-opening hatch assembly 100 may be substantially flush with the surface of the roof 11 by being substantially level or even with the surface of the roof 11, with the only portions thereof protruding upwardly from the surface of the roof 11 caused by the thicknesses of the materials of the outer surface of the flange portion 26 and the outer planar portion 52 of the dome 50. This is facilitated by having a substantial portion of the sidewall section 22 of the frame 20 protruding into the vehicle interior. The inner portion 54 of the dome 50 includes the tubular sleeve 51 on one of the sides and a pair of opposed joists 56 formed on sides of the dome 50 that are adjacent to the tubular sleeve 51. The latch assembly 60 may attach to the inner portion of the dome 50 on the side of the dome 50 that is opposed to the tubular sleeve 51. The opposed joists 56 fixedly attach to an inside of the outer planar portion 52 of the dome 50 near its periphery, and are structurally coupled using a spanning web portion 57. In one embodiment, the opposed joists 56 and the spanning web portion 57 form an I-beam configuration. The opposed joists 56 attach to the dome 50 to fit within the aperture 24 contiguous to portions of the sidewall section 22 of the frame 20 and, in combination with the spanning web portion 57 are capable of providing structural integrity to the dome 50. A rim 58 located on an outer periphery of the inner portion of the dome 50 may compress against the dome gasket 59 on the continuous upper peripheral surface 25 of the sidewall section 22 of the frame 20 by urgings of the first and second over-center toggle linkage mechanisms 30, 40.

Figure 4:
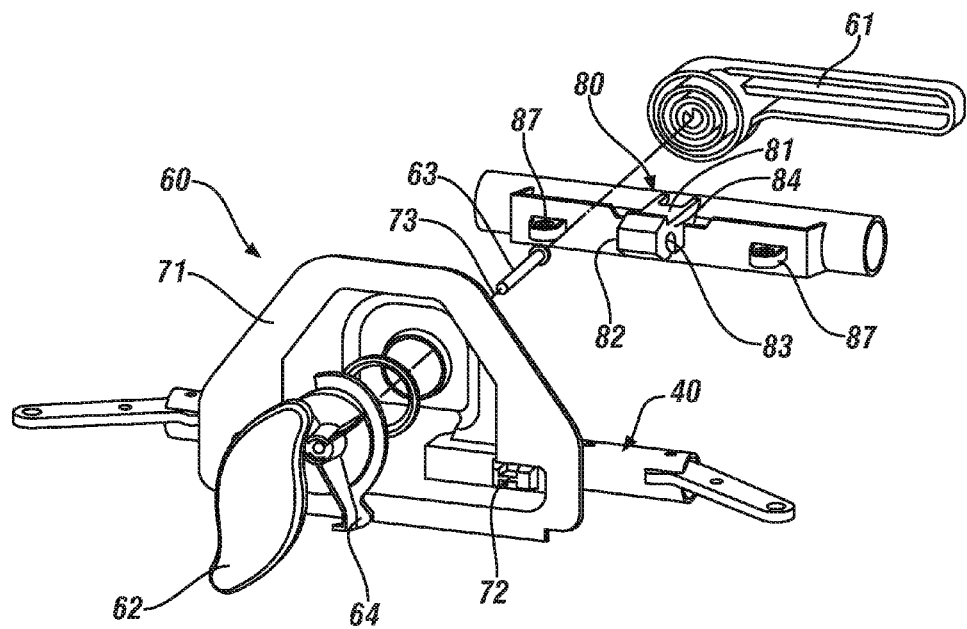
FIG. 4 schematically illustrates an exploded isometric view of selected elements of the latch assembly for an embodiment of the hatch assembly described with reference to FIGS. 1, 2 and 3, in accordance with the disclosure.
Figure 5:
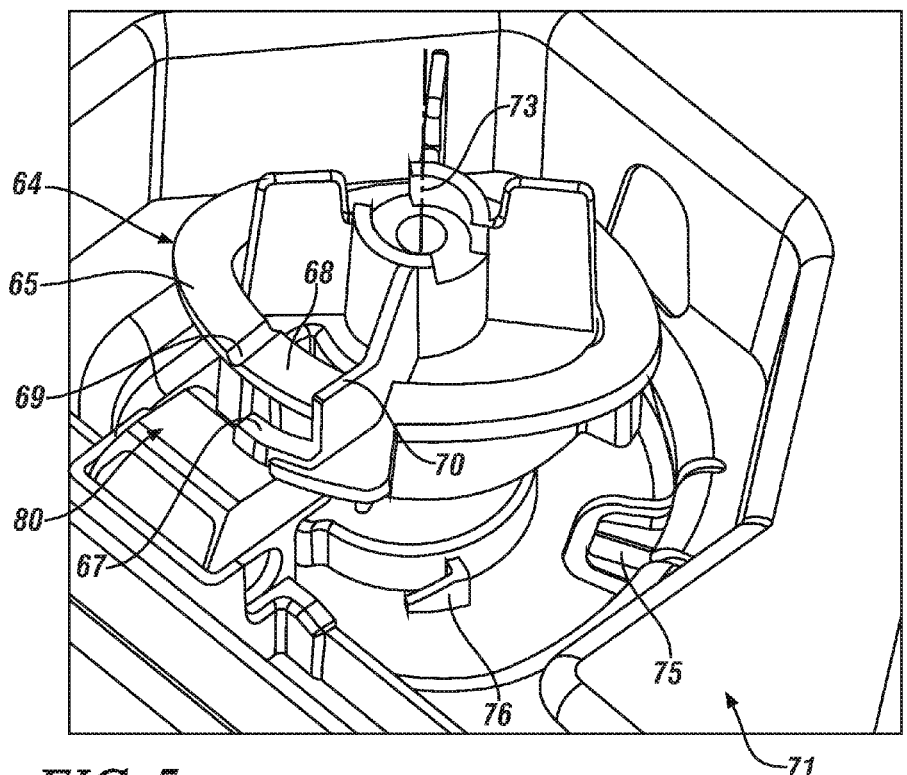
FIG. 5 schematically illustrates an isometric view of a lock wedge and cover of the latch assembly for an embodiment of the hatch assembly described with reference to FIGS. 1, 2 and 3, in accordance with the disclosure.
Figure 6:
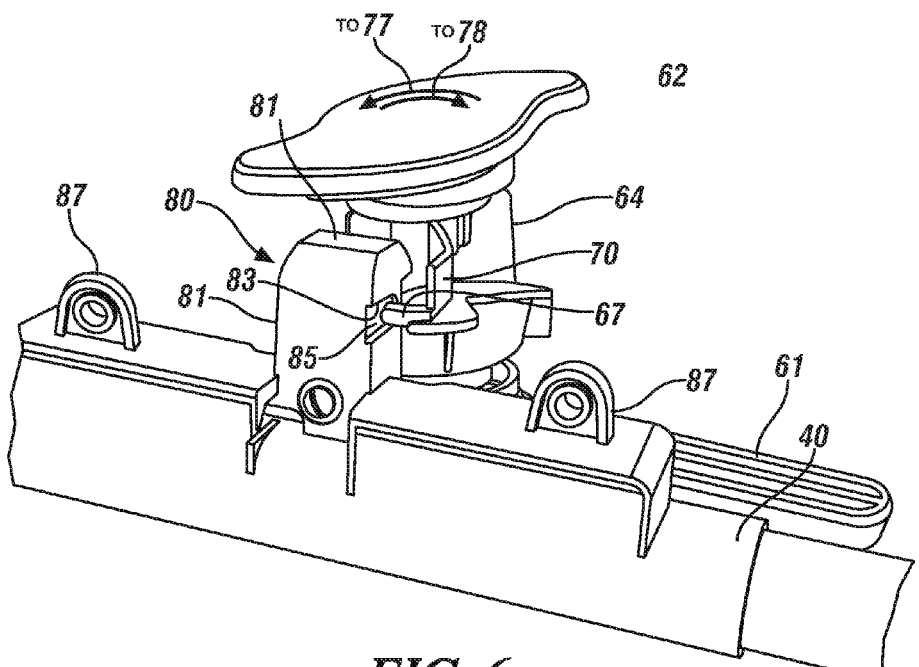
FIG. 6 schematically illustrates an isometric view of a portion of the latch assembly and the cam-following latch keeper of the latch assembly for an embodiment of the hatch assembly described with reference to FIGS. 1, 2 and 3, in accordance with the disclosure.

FIGS. 4, 5, and 6 schematically show details of the latch assembly 60 and the latch keeper 80, including FIG. 4 showing an exploded isometric view of selected elements of the latch assembly 60, FIG. 5 showing an isometric view of a lock wedge 64 and cover 71, and FIG. 6 showing an isometric view of a portion of the latch assembly 60 and the cam-following latch keeper 80. As best shown with reference to FIG. 6, the cam-following latch keeper 80 attaches to the sleeve 41 of the second over-center toggle linkage mechanism 40 and includes a vertical portion 81 supporting a horizontal portion 82 that interacts with the latch assembly 60. The latch keeper 80 has a hollow structure and includes a rectangular aperture 83 in the vertical portion 81 near the horizontal portion 82. A position sensor 84 may be inserted into the hollow area of the latch keeper 80 with a sensing element near the aperture 83. The position sensor 84 may be a mechanical switch, an optical switch, or any other suitable position sensing mechanism that is configured to detect that the latch keeper 80 has completely engaged the lock wedge 64.

The latch assembly 60 includes an inner handle 61, an outer handle 62, a shaft member and fastener 63 defining an axis of rotation 73 and the lock wedge 64, all of which are attached to the dome 50 and are contained within the cover 71. The inner handle 61, outer handle 62 and lock wedge 64 are assembled together with fastener 63 and include interlocking features such that rotation of either of the handles 61, 62 causes a corresponding rotation of the other of the handles 61, 62 and rotation of the lock wedge 64. As best shown with reference to FIG. 5, the lock wedge 64 nests within the cover 71 and preferably includes a circumferential recess area 85, a helical locking surface portion 65 that is orthogonal to the axis of rotation 73 leading to flat surface area portion 68 ending at a reinforcing element 70. An indent 69 may be formed at a junction between the flat surface area portion 68 and the helical locking surface portion 65. The lock wedge 64 also includes a radial projection near the reinforcing element 70 that supports a sensor activation tab 67. The recess area 85 accommodates insertion of the horizontal portion 82 of the latch keeper 80 when the orienting tabs 87 are aligned with and preferably partially inserted into tab recesses 72 formed in the cover 71 and the inner and outer handles 61, 62 are in a first, open/test position 77. The flat surface area portion 68 and the reinforcing element 70 are located on the lock wedge 64 at a position associated with the inner and outer handles 61, 62 being in a second, closed position 78. The helical locking surface portion 65 is designed to have a magnitude of travel along the axis of rotation 73 such that 90 degrees of rotation about the axis of rotation 73 translates to 22 mm of linear travel/displacement along the axis of rotation 73. Thus, when the horizontal portion 82 of the latch keeper 80 is inserted into the recess area 85 and engages the helical locking surface portion 65 by rotation of the lock wedge 64, the latch keeper 80 and thus the dome 50 moves towards the frame 20. When the lock wedge 64 rotates and moves the latch keeper 80 such that the latch keeper 80 approaches the reinforcing element 70 of the lock wedge 64, the sensor activation tab 67 engages the sensing element of the position sensor 84.

The cover 71 includes a surface-molded spring 75 and a pair of opposed stoppers 76. The surface-molded spring 75 interacts with the inner handle 61 to lock the inner handle 61 in the first, open/test position 77. The opposed stoppers 76 interact with the lock wedge 64 to restrict and thus limit rotation of the lock wedge 64 to the first, open/test position 77 and the second, closed position 78. The handles 61, 62 may be in the first, open/test position 77, wherein the latch keeper 80 is disengaged from the lock wedge 64 allowing the sleeve 51 of the dome 50 to rotate about the sleeve 31 of the first toggle link 30, thus allowing the dome 50 to open when urged open by an operator. The recess area 85 accommodates insertion of the horizontal portion 82 of the latch keeper 80 when the orienting tabs 87 are aligned with and preferably partially inserted into tab recesses 72 formed in the cover 71 when the handles 61, 62 are in the first, open/test position 77. Such position is indicated by the position sensor 84, which conveys to a controller or alarm system that the dome 50 is opened.

The handles 61, 62 may be in the second, closed position 78, wherein the latch keeper 80 is engaged with the lock wedge 64 with the horizontal portion 82 of the latch keeper 80 resting completely on the flat surface area portion 68 of the lock wedge 64. The lock wedge 64 engages latch keeper 80 at the reinforcing element 70 of the lock wedge 64 such that the sensor activation tab 67 engages the sensing element of the position sensor 84 when the handles 61, 62 are in the closed position 78. The closed position 78 is indicated by the position sensor 84, which conveys a signal to a controller or alarm system indicating that the dome 50 is closed.

The handles 61, 62 may be rotated into an intermediate position between the open/test position 77 and the closed position 78, with such position indicated by the position sensor 84, indicating that the dome 50 is opened. As such, the open/test position 77 defines a first limit of rotational travel of the handles 61, 62 and the lock wedge 64 in a first rotational direction and the closed position 78 defines a second, opposed limit of rotational travel of the handles 61, 62 and the lock wedge 64 in a second, opposed rotational direction. In one embodiment, the rotational travel traversed between the open/test position 77 and the closed position 78 is 90 degrees of rotation, and thus the difference between the first limit of rotational travel and the second, opposed limit of rotational travel is a total rotational travel of 90 degrees of rotation. This arrangement permits regular testing of the hatch assembly 100 by opening and closing of the dome 50.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A hatch assembly attachable to a roof of a vehicle, comprising:
    a removable dome attached to a frame including opposed first and second linkage mechanisms and a latch assembly;

the frame mountable in an opening through the roof of the vehicle and including an annular sidewall section defining an aperture and an outwardly extending flange portion peripheral to the annular sidewall portion;

the annular sidewall section including a continuous upper peripheral surface;

the dome having an outer planar surface covering the aperture and an inner surface including a tubular sleeve, wherein the tubular sleeve is inserted into a tubular sleeve member of the first linkage assembly;

a latch keeper attached to the second linkage assembly;

a latch assembly attached to the inner surface of the dome on a side of the dome that is opposed to the tubular sleeve, the latch assembly rotatably coupled to a lock wedge, the lock wedge including a helical locking surface;

the lock wedge disengaged from the latch keeper when the latch assembly is at a first position associated with a first limit of rotational travel;

the lock wedge engaged with the latch keeper to urge the latch keeper to a second position when the latch assembly is rotated to a second, opposed limit of rotational travel;

the dome seated onto the frame when the first and second linkage mechanisms are in closed positions and the latch assembly is at the second position; and a position sensor coupled to the latch keeper and a sensor activation tab coupled to the lock wedge, wherein the sensor activation tab is disposed to interact with the position sensor only when the lock wedge engages the latch keeper and urges the latch keeper to the second position.

2. The hatch assembly of claim 1, further comprising the annular sidewall section protruding into an interior of the vehicle.

3. The hatch assembly of claim 1, wherein the hatch assembly attachable to a roof of a vehicle comprises an outwardly opening hatch assembly conformable to a curved surface and attachable to a roof of the vehicle.

4. The hatch assembly of claim 1, wherein the inner surface of the dome further comprises opposed joists structurally coupled by a spanning web portion fixedly attached thereto.

5. The hatch assembly of claim 1, further comprising a plurality of orienting tabs adjacent to the latch keeper, and a corresponding plurality of tab recesses formed in a cover surrounding the latch assembly on the inner surface of the dome, wherein the latch keeper is insertable into a recess area on the lock wedge when the latch assembly is positioned at the first position.

6. The hatch assembly of claim 1, wherein the lock wedge further comprises a flat surface portion adjacent to the helical locking surface, and wherein the latch assembly being in the second position includes the latch assembly resting on the flat surface portion of the lock wedge.

7. The hatch assembly of claim 1, wherein the first limit of rotational travel and the second, opposed limit of rotational travel comprises a total rotational travel of 90 degrees of rotation.

8. The hatch assembly of claim 1, wherein the aperture comprises a substantially rectangular aperture.

9. An outwardly opening hatch assembly conformable to a curved surface and attachable to a roof of a vehicle, comprising:

a removable dome attached to a frame including opposed first and second over-center toggle linkage mechanisms and a latch assembly;

the frame mountable in an opening through the roof of the vehicle and including an annular sidewall section defining a substantially rectangular aperture and an outwardly extending flange portion peripheral to the annular sidewall portion and including a plurality of integral cam tie-down latches and a resilient gasket;

the annular sidewall section including a continuous upper peripheral surface;

the dome having an outer planar surface covering the aperture and an inner surface including a tubular sleeve, wherein the tubular sleeve is inserted into a tubular sleeve member of the first over-center toggle linkage assembly;

a latch keeper attached to the second over-center toggle linkage assembly;

a latch assembly including a cover attached to the inner surface of the dome on a side of the dome opposed to the tubular sleeve, the latch assembly including an inner handle and an outer handle rotatably coupled to a lock wedge, wherein the first and second handles rotatably traverse between a first rotational position and an opposed second rotational position;

the lock wedge including a circumferential recess area, a helical locking surface that is orthogonal to a direction of rotation of the latch assembly and a flat surface portion adjacent to the helical locking surface, wherein the circumferential recess area is associated with the first rotational position of the first and second handles and the flat surface portion is associated with the second, opposite position of the first and second handles;

the lock wedge disposed to disengage from the latch keeper when the first and second handles are at the first rotational position;

the lock wedge disposed to engage the latch keeper upon rotation of the first and second handles away from the first rotational position;

the lock wedge disposed to urge the latch keeper to a first position to lock the dome to the frame when the latch assembly rotates to the second rotational position; and the dome disposed to sealably seat onto the frame when the first and second over-center toggle linkage mechanisms are in closed positions and the latch keeper is in the second position.

10. The hatch assembly of claim 9, further comprising the annular sidewall section protruding into an interior of the vehicle and the outer planar surface of the dome being flush with the roof of the vehicle.

11. The hatch assembly of claim 9, wherein the lock wedge disengaged from the latch keeper when the first and second handles are at the first rotational position comprises the lock wedge releasing the latch keeper to unlock the dome from the frame when at the first rotational position.

12. The hatch assembly of claim 9, wherein the inner surface of the dome further comprises opposed joists structurally coupled by a spanning web portion fixedly attach thereto.

13. The hatch assembly of claim 9, further comprising a position sensor coupled to the latch keeper and a sensor activation tab coupled to the lock wedge, wherein the sensor activation tab interacts with the position sensor only when the lock wedge interacts with the latch keeper to urge the latch keeper to the first position.

14. The hatch assembly of claim 9, further comprising a plurality of orienting tabs adjacent to the latch keeper, and a corresponding plurality of tab recesses formed in a cover surrounding the latch assembly on the inner surface of the dome, wherein the latch keeper is insertable into the recess area on the lock wedge when the lock wedge is at the first position.

15. The hatch assembly of claim 9, comprising the latch assembly resting on the flat surface portion of the lock wedge when the lock wedge is at the second position.

16. The hatch assembly of claim 9, wherein first limit of rotational travel and the second, opposed limit of rotational travel comprises a total rotational travel of 90 degrees of rotation.

* * * * *